United States Patent [19]
Rabinow et al.

[11] Patent Number: 5,394,218
[45] Date of Patent: Feb. 28, 1995

[54] FOCUSING AID FOR COPYING CAMERAS

[76] Inventors: Gladys Rabinow; Jacob Rabinow, both of 6920 Selkirk Dr., Bethesda, Md. 20817

[21] Appl. No.: 120,554
[22] Filed: Sep. 14, 1993
[51] Int. Cl.⁶ .......................................... G03B 27/52
[52] U.S. Cl. ....................................... 355/55; 355/43; 355/60
[58] Field of Search ...................... 355/43, 44, 45, 55, 355/60

[56] References Cited

U.S. PATENT DOCUMENTS

| | | |
|---|---|---|
| 2,082,170 | 6/1937 | McRae . |
| 2,110,324 | 3/1938 | Castle . |
| 2,791,936 | 5/1957 | Mason . |
| 3,890,045 | 6/1975 | Bernstein et al. ................. 355/44 X |
| 4,244,649 | 1/1981 | Rees . |
| 4,425,037 | 1/1987 | Hershel . |
| 4,540,278 | 9/1985 | Phillip ............................... 355/55 |
| 4,592,648 | 6/1986 | Tabarelli et al. ...................... 355/43 |
| 4,788,576 | 11/1988 | Saito . |
| 4,789,880 | 12/1988 | Mori et al. ............................ 355/55 |
| 4,937,620 | 6/1990 | Ozawa et al. ...................... 355/55 X |
| 5,259,339 | 8/1993 | Ziegler ................................ 355/43 |

Primary Examiner—Richard A. Wintercorn
Assistant Examiner—Daniel P. Malloy
Attorney, Agent, or Firm—William D. Hall

[57] ABSTRACT

A device for assisting a person in focusing a camera on a surface is provided. A mirror at an angle of 45° to the horizontal, and an incandescent filament, are mounted on a device that may rest on the surface to be photographed. The distance from the filament to a point on the mirror equals the distance from that point to the surface. By focusing the camera on the image of the filament that appears in the mirror, the camera will be correctly focused on the surface.

6 Claims, 1 Drawing Sheet

FOCUSING AID FOR COPYING CAMERAS

BACKGROUND OF THE INVENTION

Copying documents by a camera goes back to the beginnings of photography. It is done in duplicating or restoring damaged photographs, to change size or emphasis in a picture, to produce a microphotograph of printed or pictorial material (microfile) or to prepare printing plates or other material for printing books, magazines, newspapers etc.

Very special and very sophisticated cameras are used for copying documents. Some such cameras are built into the structure of the laboratories where they are used, so that the film is fed into and out of the camera and is developed in the darkroom which, in effect, is part of the camera equipment.

The art of focusing copying cameras is well represented in Class 355, sub classes 44, 55, 61, 62 and 63. Some patents of interest that may be mentioned are as follows:

U.S. Pat. No. 2,082,170 to McRae shows a device for focusing an enlarger. The real image projected onto the easel is reflected by a mirror so that it falls on the underside of a ground glass. The image is then observed from above the ground glass. This is usually easier to do than looking directly at the easel.

A similar device is shown in U.S. Pat. No. 2,100,324 to Castle except that here the image on the ground glass is viewed thru a magnifying glass.

U.S. Pat. No. 2,791,936 carries the above ideas one step further. Here, instead of placing the real image on a ground glass, the image is directed into a magnifier. The magnifier is focused on the plane that contains the image. Thus the image is seen "in air" and the "noise" of the ground glass is avoided.

The art of copying images or projecting images onto paper, photographic emulsions, or solid state wafer surfaces is very extensive but we found no art where a bright virtual image is projected into the plane of the surface of interest. Mirrors are used to manipulate or move the image for repeat exposures (U.S. Pat. No. 4,425,037); to produce multiple images (U.S. Pat. No. 4,788,576); or to project special registration lines onto a suitable easel (U.S. Pat. No. 4,244,649). Our invention is not intented to replace the automatic means built into the elaborate cameras of the extensive art of large copying cameras. It is a relatively simple device to help the operator of a camera to optimize the setting of his or her camera to obtain the sharpest image of the document or a surface being photographed.

SUMMARY OF THE INVENTION

When accurately focusing a camera, the operator needs a bright and well defined object on which to focus. The document being photographed often does not provide such an object. The material may have no sharp lines, it may be of low contrast and the light available for illuminating the document may not be of high enough intensity for accurate focusing.

The camera operator may also prefer to use a small lens opening in his camera to obtain maximum sharpness, or maximum flatness of field.

It is well known that focusing a camera with its lens wide open and then "stopping down" the lens to a much smaller opening may produce a phenomenon called "focus shift" where the focusing changes as the lens opening is changed.

The operator may also want to check the sharpness of the image not only in the center of the copy of the copy field but also near the edges and corners of the image. He or she may certainly do this with the lens "stopped down." Using our invention this is easily accomplished because the image the operator sees is very bright and easily seen in the camera.

The device of the invention comprises a mirror mounted at an angle of 45° to the horizontal, for example, with an incandescent filament directing light on the mirror. The distance between the filament and a point on the mirror is equal to the distance of said point is located above the material to be copied. THe distance of the filament from the mirror is adjustable. The mirror can be at any of many angles if the distance between the mirror and the filament is properly selected.

BRIEF DESCRIPTION OF THE DRAWINGS

The basic structure of our focusing aid is illustrated in the several accompanying figures.

DETAILED DESCRIPTION

Figure 1:
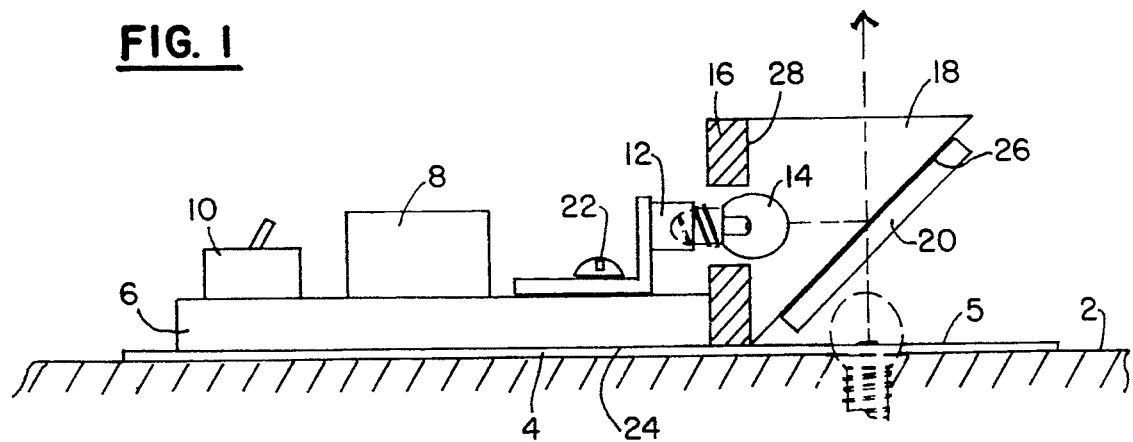
FIG. 1 shows a partial section view of our focusing aid.

FIG. 1 shows a side view of one version of our invention as lying on a surface 2 containing a sheet of paper 4. The thickness of paper 4 is greatly exaggerated in this FIG. 1, although it must be understood that even if item 4 were very thick, such as a stone tablet, or a metal plate, our device would still function properly to aid the copying of its top surface.

The focusing aid is built on a base plate 6. It carries a battery 8, a switch 10, a bulb socket 12 and a bulb 14. The bulb chosen should have a very compact filament such as we found in one (1) volt bulbs for small flashlights.

While we do not show the electrical connections between the components shown in FIG. 1, it should be understood that the battery 8, the switch 10, the socket 12, and the incandescent filament of bulb 14 are all connected in series so that when the switch 10 is thrown into the "ON" condition, the bulb 14 lights.

Figure 2:
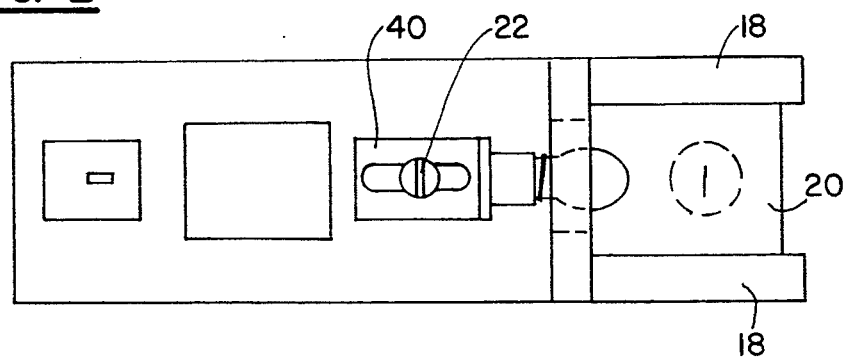
FIG. 2 shows a top view of the device of FIG. 1.

Attached to base plate 6 is a vertical wall member 16 and attached to this wall 16 are two side plates 18 as seen best in FIG. 2.

Cemented or otherwise attached to plates 18—18 is a front-surface mirror 20.

The socket 12 can be moved along base plate 6 by loosening screw 22 and positioning the filament of the bulb util it lies in the right-hand (as viewed in FIG. 1) surface 28 of the vertical plate 16.

The surface 28 is at exactly right angle (90°) to the bottom surface 24 of plate 6, and the inclined edges 26 of the side plates 18—18 are exactly at 45° to the right hand surface 28 of plate 16, and the surfaces 26 and 28 meet in the plane of the bottom surface 24 of the plate 6. Any object in the plane of surface 28 will appear, when viewed in the mirror 20, as to lie in the plane of surface 24.

In order to make our invention work, it is not necessary to use a right angle surface and a 45° mirror to place an object into the plane of the surface to be copied. Various other angles can be used but 90° and 45° cuts and grinding angles are easily produced in a machine shop and these were used in our sample. The mount 40 for bulb 14 has an elongated slot which permits the distance between the bulb 14 and the mirror 20 to be varied when bolt 22 is loosened.

While we show the use of a front-surface mirror, this is not necessary. A conventional rear-surface mirror can be used but provisions must be made to compensate the optics for the thickness of the glass.

Figure 3:
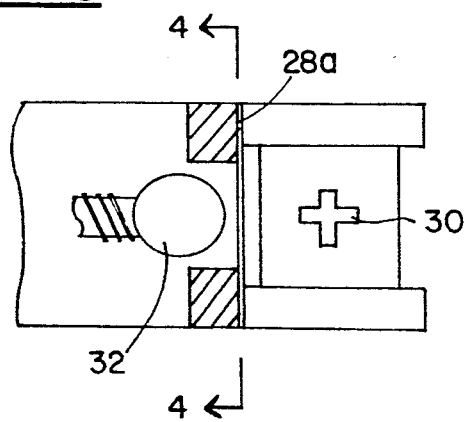
FIG. 3 shows an alternative construction of a portion of the device.
Figure 4:
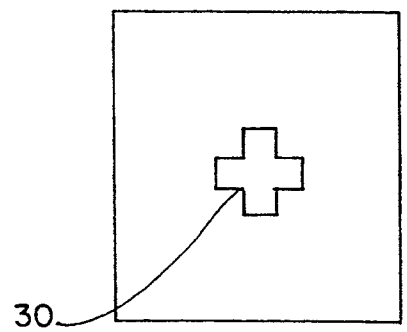
FIG. 4 shows the view of the reticle as used in the device of FIG. 3.

In place of the filament of the small bulb, a bright image can be obtained by mounting a thin membrane of suitable material on the surface 28a of the assembly of FIG. 3. This thin member that may be a piece of metal can have an etched or punched hole in it like 30 (FIG. 4). The bulb 32 (FIG. 3) can be of any suitable type to illuminate the reticle opening 30.

The advantage of the design (of FIGS. 3 and 4) is that the position of bulb 32 does not need adjustment and the shape of its filament is of no importance.

It is obvious that many modifications of this basic invention can be made. The mirror used can be replaced by a prism. Magnets can be built into the base 6 to keep the device firmly attached to steel copy supports, the whole base assembly can be molded in one piece instead of being made up of several pieces fastened together, and so on.

It is also obvious that my device can be used to aid the focusing of optical devices other than cameras. For example, the device can be used to focus a microscope or a pair of binoculars, or as an aid in testing a lens.

I claim to have invented:

1. A device to aid in focusing an optical device onto a first surface, comprising:
   means for producing a brightly illuminated image, said device having a second surface for contacting said first surface, and reflecting means to make the reflection of this said image to appear to be in the said first surface.

2. The device of claim 1 and means to adjust the location of the said illuminated image so that its reflection by the said reflecting means locates the reflected image so as to coincide with the plane of the said surface.

3. The device of claim 2 where the said illuminated image is a real image and the said reflected image is a virtual image.

4. A device to place a brightly lit virtual image of a bright source of light onto a surface, comprising a brightly lit source of light, reflecting means to intercept some of the light from said source and to reflect this light so as to forms the said brightly lit virtual image, the said reflecting means so positioned in said device that the said brightly lit virtual image is coincident with the said surface.

5. The invention in claim 4 where the said brightly lit source of light is a filament of an electric bulb.

6. The invention of claim 4 where the said brightly lit source of light is a reticle consisting of a diaphragm with a series of perforations, said perforations illuminated by a separate source of light.

* * * * *